United States Patent [19]

Bartholomew

[11] Patent Number: 4,681,351

[45] Date of Patent: Jul. 21, 1987

[54] SWIVELABLE QUICK CONNECTOR ASSEMBLY

[75] Inventor: Donald D. Bartholomew, Marine City, Mich.

[73] Assignee: Proprietary Technology, Inc., Southfield, Mich.

[21] Appl. No.: 776,644

[22] Filed: Sep. 16, 1985

Related U.S. Application Data

[63] Continuation-in-part of Ser. No. 360,201, Mar. 22, 1982, Pat. No. 4,601,497, which is a continuation-in-part of Ser. No. 201,711, Oct. 29, 1980, Pat. No. 4,423,892.

[51] Int. Cl.⁴ .............................................. F16L 37/12
[52] U.S. Cl. ..................................... 285/319; 285/921
[58] Field of Search ........................ 285/319, 921, 317

[56] References Cited

U.S. PATENT DOCUMENTS

| | | | |
|---|---|---|---|
| 1,297,591 | 3/1919 | Prescott | 285/319 X |
| 1,542,421 | 6/1925 | Strongson . | |
| 1,835,251 | 12/1931 | Wetstein | 285/319 X |
| 2,123,889 | 7/1938 | Gleason . | |
| 3,314,696 | 4/1967 | Ferguson et al. | 285/174 |
| 3,450,424 | 6/1969 | Calisher | 285/305 |
| 3,453,005 | 7/1969 | Foults | 285/82 |
| 3,534,988 | 10/1970 | Lindsey | 285/305 |
| 3,538,940 | 11/1970 | Graham . | |
| 3,574,359 | 4/1971 | Klein | 285/305 X |
| 3,584,902 | 6/1971 | Vyse | 285/305 |
| 3,711,125 | 1/1973 | Dehar | 285/111 |
| 3,718,350 | 2/1973 | Klein | 285/39 |
| 3,724,882 | 4/1973 | Dehar | 285/243 |
| 3,751,078 | 8/1973 | O'Brian et al. | 285/921 X |
| 3,826,523 | 7/1974 | Eschbaugh | 285/39 |
| 3,929,356 | 12/1975 | DeVincent et al. | 285/305 |
| 3,929,357 | 12/1975 | DeVincent et al. | 285/319 |
| 3,980,324 | 9/1976 | Bouteille et al. | 285/179 |
| 4,005,883 | 2/1977 | Guest | 285/322 |
| 4,009,896 | 3/1977 | Brewer | 285/305 |
| 4,080,752 | 3/1978 | Burge | 285/321 X |
| 4,111,464 | 9/1978 | Asano et al. | 285/111 |
| 4,123,089 | 10/1978 | Viero et al. | 285/39 |
| 4,123,091 | 10/1978 | Cosentino et al. | 285/39 |
| 4,128,264 | 12/1978 | Oldford | 285/41 |
| 4,135,745 | 1/1979 | Dehar | 285/319 |
| 4,214,586 | 7/1980 | Mericle | 285/370 |
| 4,266,814 | 5/1981 | Gallagher | 285/319 |
| 4,541,658 | 9/1985 | Bartholomew | 285/319 |

Primary Examiner—Thomas F. Callaghan
Attorney, Agent, or Firm—Harness, Dickey & Pierce

[57] ABSTRACT

A swivelable quick connect assembly for use with tubular conduits is disclosed as comprising a housing having an axial bore for receiving one end of the conduit, an elastomeric ring-like seal is disposed in the bore for providing a fluid tight seal between confronting portions of the conduit and the housing, an annular bushing is disposed in the bore for positioning the seal and for guiding the one end of the conduit into nesting relationship with the bore, and a retainer is detachably secured to the housing and is cooperable with an annular projection on the conduit for securing the conduit in its operative position within the bore, the retainer having resilient deformable portions which are adapted to snap over the locking wall upon insertion of the conduit into the bousing bore. Also, a retainer element is disclosed as comprising a collar and at least one or more deflectable legs projecting from the collar. The legs are bent to form at least one or more integral means for securing the conduit in the retainer element and in the housing.

12 Claims, 10 Drawing Figures

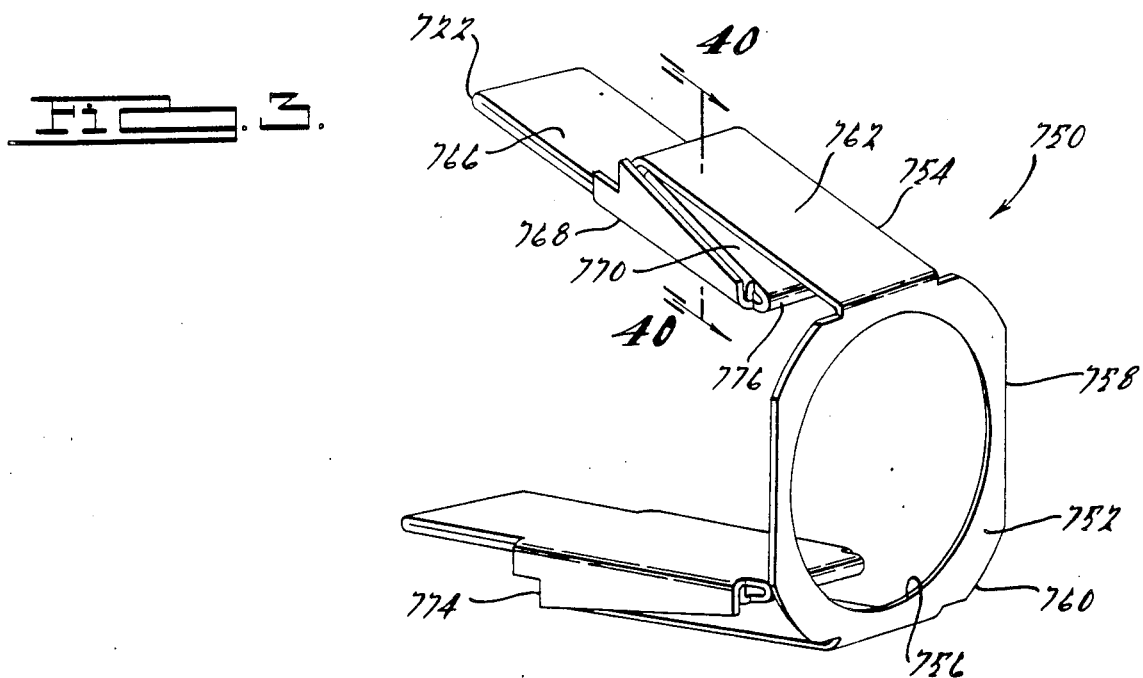
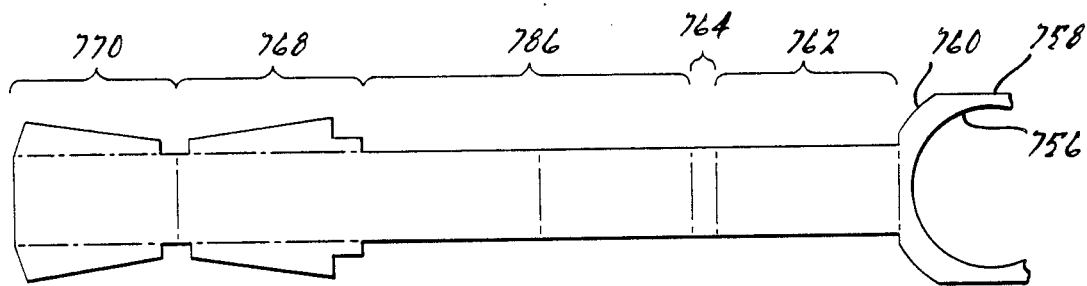
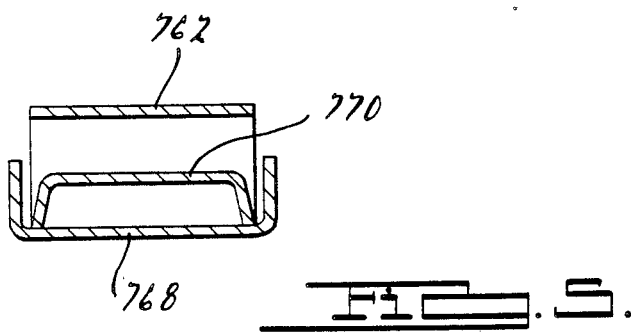

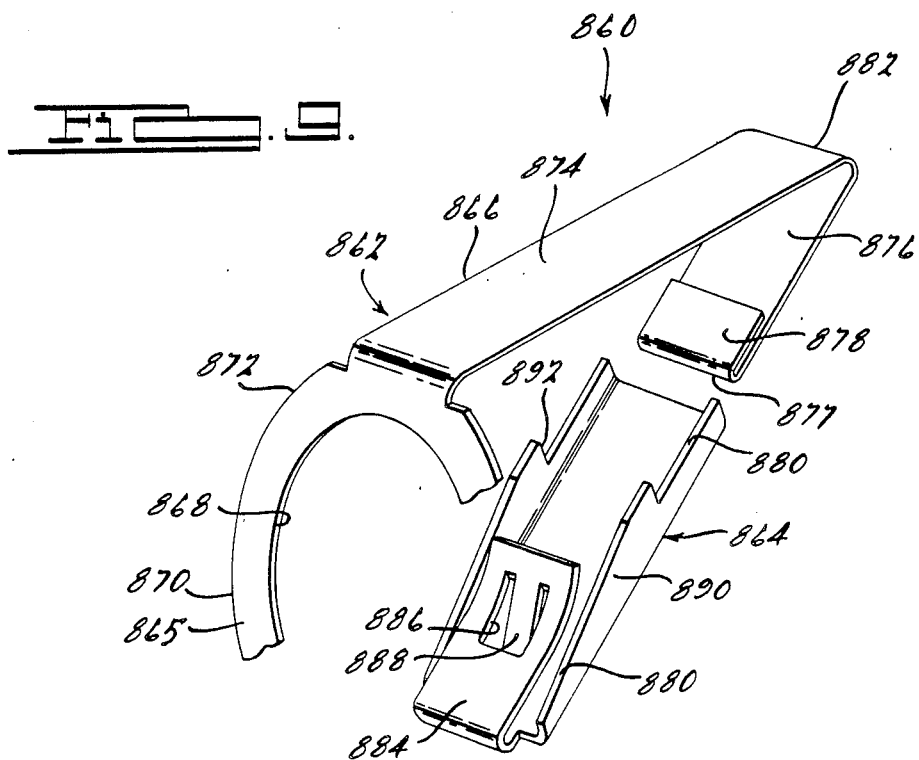
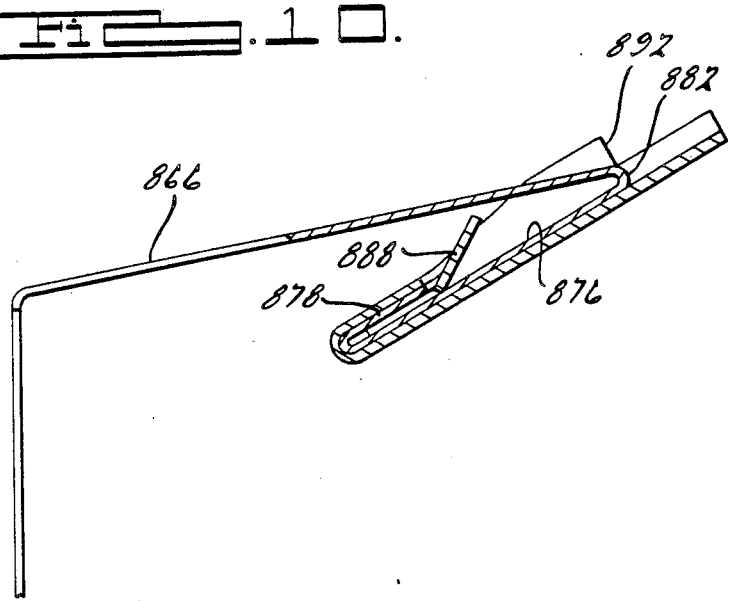

4,681,351

SWIVELABLE QUICK CONNECTOR ASSEMBLY

CROSS REFERENCE TO A RELATED APPLICATION

This application is a continuation-in-part of application Ser. No. 360,201, filed Mar. 22, 1982, now U.S. Pat. No. 4,601,497 which is a continuation-in-part of application Ser. No. 201,711 filed Oct. 29, 1980 now U.S. Pat. No. 4,423,892, which are hereby incorporated by reference.

BACKGROUND AND SUMMARY OF THE INVENTION

The present invention relates to a connector assembly for providing a swivelable quick connection.

In the automotive industry, as well as for many other industries, the need always exists for low-cost, reliable, and easy to assemble components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a swivelable quick connection between fluid conveying conduits.

In addition, it is an object of the present invention to provide a pre-assembled connector housing and retainer element so that a connection to a tubular fluid conveying conduit may be made in one step without resorting to any tools.

Another object of the present invention is to provide a pre-assembled connector housing and retainer element so that a snapping connection may be made to a tubular fluid conveying conduit.

Another object of the present invention is to provide a connector assembly that may be employed to join dissimilar electrically conducting materials that would be otherwise subject to galvanic corrosion.

It is a further object of the present invention to provide a connector assembly which is adapted to provide for a bleed-down position when disconnecting a conduit from the housing of the connector assembly.

It is another object of the present invention to provide a pre-assembled connector conduit unit which requires only a one-step snapping connection to be joined to a connector housing.

It is yet another object of the present invention to provide a removable, disposable cover for protecting the pre-assembled connector conduit unit.

It is a further object of the present invention to provide a disposable stuff-plug for the connector assembly which is adapted to install one or more sealing elements in an axial bore of the connector housing and detachably secure a retainer element to the connector housing, as well as to seal the axial bore of the connector housing.

It is still a further object of the present invention to provide a connector assembly which employs a check valve unit disposed in the axial bore of the housing for selectively blocking fluid flow.

It is also an object of the present invention to provide an improved retainer element which operates to both secure the conduit in the axial bore or the housing and position the sealing element within the axial bore of the housing.

It is a more specific object of the present invention to provide an improved retainer element formed with three or more leg members which operate to detachably secure the retainer element to the housing, the sealing means within the housing, the conduit in its operative position within the axial bore of the housing, and provide better resistance to off axis forces on the conduit.

To achieve the foregong objects, the present invention provides a swivelable connector assembly which generally comprises a tubular conduit, a housing, sealing means, and retainer means. The tubular conduit is adapted to convey fluid and is formed with an annular projection disposal a predetermined distance from the end of the conduit to be connected. The housing is formed with an axial bore for receiving the conduit at a first end and for providing a fluid path at a second end, and includes an inwardly extending annular lip (or suitable apertures) at the first end to detachably secure the retainer means to the housing. The sealing means is disposed within the axial bore of the housing for providing a fluid tight seal between confronting portions of the conduit and the housing. The retainer means is adapted to be disposed generally within the axial bore of the housing for cooperating with the annular projection of the conduit to secure the conduit in its operative position within the axial bore of the housing. The retainer means is a one piece metal retainer element which includes at least two circumferentially spaced leg members which extend from an integral collar member at one end thereof. Each of the leg members has a deflectable leg portion which extends from the collar and ends in a first bend to provide a backstop for securing the retainer element in the connector assembly, and a retaining leg portion which extends from the deflectable leg portion and inclines generally toward the aperture in the collar. The end of the retaining leg portion is formed to engage the conduit such that the retaining leg portion will resist the disconnection of the conduit from the connector assembly. The retaining leg portion also includes a flange for increasing the resistive force of said retaining leg portion.

Additional objects and advantages of the present invention will become apparent from reading of the detailed description of the preferred embodiments which make reference to the following set of drawings in which:

BRIEF DESCRIPTION OF THE DRAWINGS

FIG. 3 is a perspective view of another embodiment of a retainer element.

FIG. 4 is an expanded plan view of the retainer element of FIG. 3.

FIG. 5 is a cross-sectional view along line 40—40 of FIG. 3.

FIG. 9 is an exploded perspective view of another embodiment of a retainer element.

FIG. 10 is a side cross-section elevational view of the retainer element of FIG. 9.

DETAILED DESCRIPTION OF THE PREFERRED EMBODIMENTS

Figure 1:
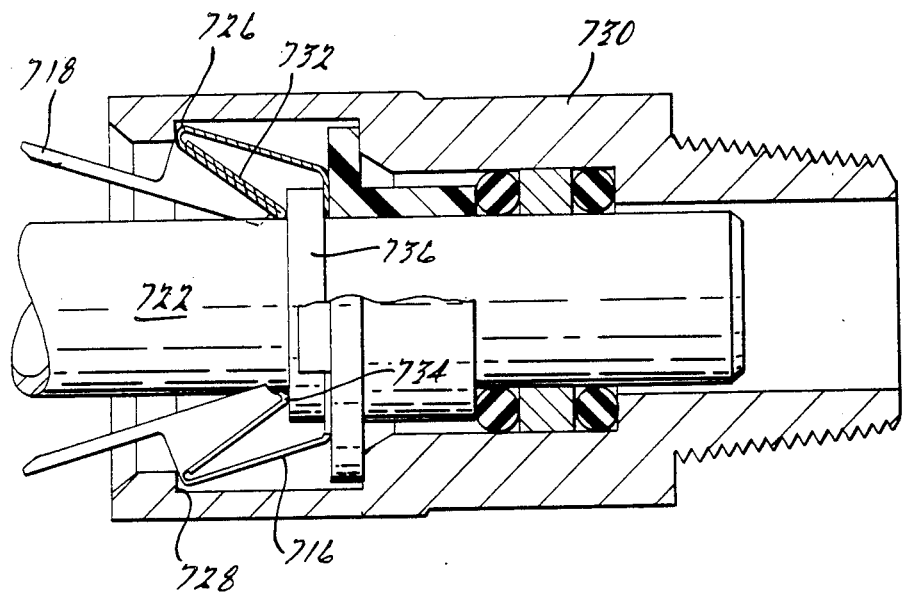
FIG. 1 is a side elevation view, partially in cross-section, of an embodiment of a connector assembly having a retainer element according to the present invention.
Figure 2:
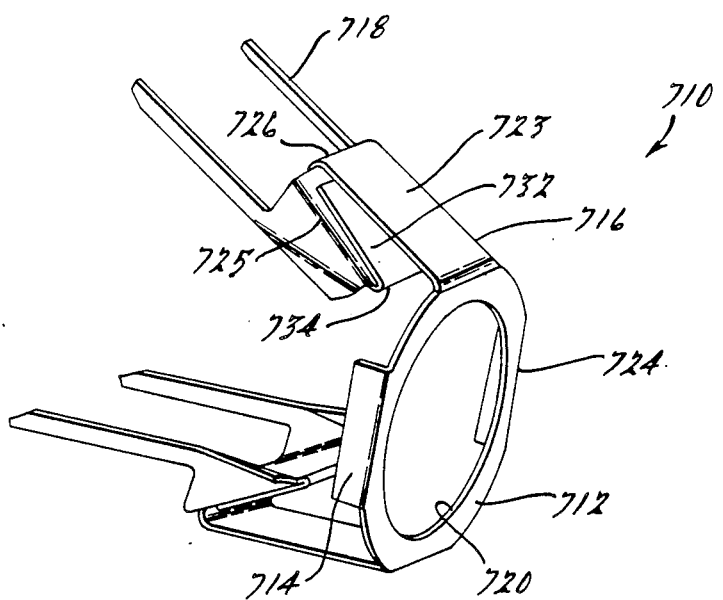
FIG. 2 is a perspective view of the retainer element of FIG. 1.

Referring to FIGS. 1 and 2, a partial cross-section and a perspective view of another retainer element 710 is shown. In the embodiment illustrated, retainer element 710 is preferably manufactured from a metallic material. The retainer element 710, preferably a one-piece construction, includes a collar 712, at least one or more flanges 714, at least one or more deflectable bent configuration legs 716 and at least one or more deflectable fingers 718.

The collar 712 has an aperture 720 for providing passage of a conduit 722 through the retainer element 710. The flanges 714 project from the collar 712, as seen in FIG. 2, forming a substantially flat edge 724 on the substantially circular collar 712. A first portion 723 projects from the collar 712. The first leg portion 723 bends forming a backstop 726 which, in turn, forms a retaining portion 725 which bends, doubling back on itself, forming a flange 732. The backstop 726 abuts against a housing flange 728 for securing the retainer element 710 in the housing 730. A bend 734 formed between the retaining portion 725 and the flange 732 biases on the conduit flange 736 securing the conduit 722 in the retainer element 710.

The fingers 718 project from the retaining portion 725 of the leg 716. The fingers 718 provide a means for grasping and removing the retainer element 710 from the housing 730. The fingers 718 are generally bent in accordance with conventional sheet metal practice. Preferably, a pair of fingers 718 project from each leg 716.

Referring to FIGS. 3, 4 and 5, a perspective, a plan and a cross-sectional view of another retainer element 750 is shown. In the embodiment illustrated, retainer element 750 is preferably manufactured from a metallic material. The retainer element 750, preferably a one-piece construction (as seen in FIG. 4), includes a collar 752 and at least one or more deflectable bent configuration legs 754.

The collar 752 has an aperture 756 for providing passage of a conduit through the retainer element 750. The collar 752 has a configuration, as shown in FIGS. 39 and 40, with flat edges 758 and curved corners 760.

The bent legs 754 include a first portion 762, a tuck portion 764, an arm portion 766, a first retaining portion 768 and a second retaining portion 770. The first portion 762 of the legs 754 project from the collar 752. The first portion 762 bends which, in turn, forms the tuck portion 764 which doubles back on the first portion 762 and then bends the reverse direction forming the arm portion 766. The arm portion 766 has a bend 772 which is the terminal point of the arm portion 766. The arm portion 766 doubles back on itself and then forms the first retaining portion 768. The first retaining portion 768 has at least one or more steps 774 which secures the retaining element 750 in the housing. The first retaining portion 768 bends back on itself forming the second portion 770. The bend 776 formed between the first and second retaining portion 768 and 770 secures the conduit flange in the retainer element 750. The legs 754 are bent in accordance with conventional sheet metal practices.

Figure 6:
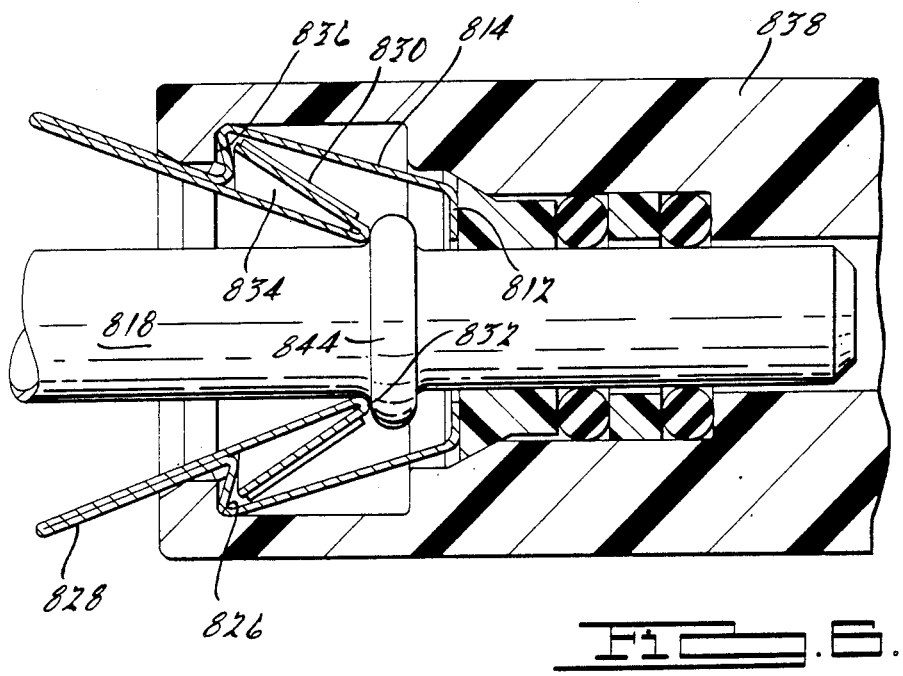
FIG. 6 is a side cross-section elevational view of another embodiment of a connector assembly having a retainer element.
Figure 7:
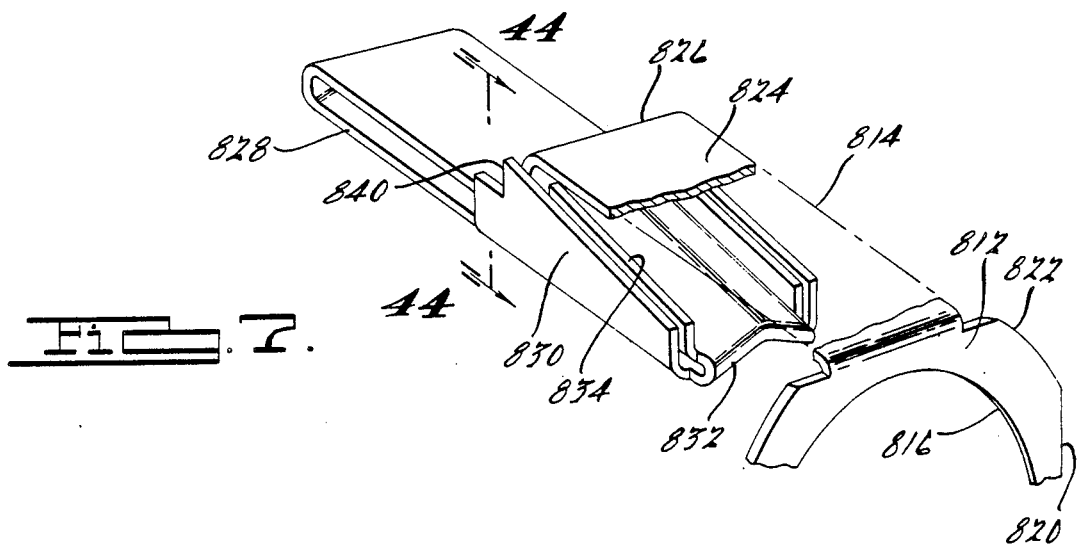
FIG. 7 is a partial cross-sectional perspective view of the retainer element of FIG. 6.
Figure 8:
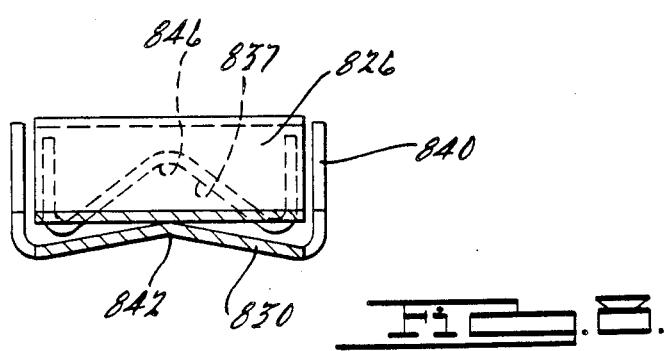
FIG. 8 is a cross-sectional view along line 44—44 of FIG. 7.

Referring to FIGS. 6, 7 and 8, a partial cross-sectional, a partial perspective and a partial cross-sectional view of another retainer element 810 is shown. In the embodiment illustrated, retainer element 810 is preferably manufactured from a metallic material. The retainer element 810, preferably a one-piece construction, includes a collar 812 and at least one or more deflectable bent configuration legs 814.

The collar 812 has an aperture for providing passage of conduit 818 through the retainer element 810. The collar 812 has a configuration, as shown in FIG. 6, with flat edges 820 and curved or round corners 822.

The legs 814 have a first portion 824, a first retaining bend 826, an arm portion 828, a first retaining portion 830, a second retaining bend 832 and a second retaining portion 834. The first portion 824 of the legs 814 project from the collar 812. The first portion 824 bends forming the first retaining bend 826. The first retaining bend 826 secures the retainer element 810 on a housing flange 836 in the housing 838. The first retaining bend 826 bends forming the arm portion 828. The arm portion 828 bends, doubling back on itself, forming the first retaining portion 830. The arm portions 828 provide a means for grasping and removing the retainer element 810 from the housing 838. The first retaining portion 830 has at least one or more steps 840 which complement the first retaining bend 826 in securing the retainer element 810 in the housing 838. The first retaining portion 830 has a V-shaped indention 842 for enhanced retaining force characteristics. The second retaining bend 832 is formed at the bend of the first and second retaining portions 830 and 834. The second retaining bend 832 abuts against the conduit flange 844 securing the conduit 818 in the retainer element 810. The second retaining portion 832 doubles back on the first retaining portion 832 and has a more dominant V-shaped indention 846, than the first V-shaped indention 842, for enhancing retaining force characteristics of the second retaining portion 832. The legs 814 are bent in accordance with conventional sheet metal practices.

Referring to FIGS. 9 and 10, an exploded view and a partial cross-sectional view of another retainer element 860 is shown. The retainer element 860 is of a multi-piece construction having a body 862 and at least one or more clasps 864. In the illustrated embodiment the body 862 is manufactured from a light flexible metallic material and the clasp 864 is manufactured from a heavier rigid metallic material.

The body 862 includes a collar 865 and at least one or more deflectable legs 866. The collar 865 has an aperture 868 for providing passage of a conduit through the retainer element 860. The collar 865 has a configuration, as shown in FIGS. 9 and 10, with flat edges 870 and curved or round corners 872.

The first portion 874 of the legs 866 project from the collar 865. The first portion 874 bends, doubling back on itself, forming a retaining portion 876 which, in turn, bends, doubling back above itself forming a flange 878. The flange 878 interlocks in the clasp 864 forming a unitary structure. The clasp 864 has an overall stepped rectangular configuration, as best seen in FIG. 9. Steps 880, preferably with inclined walls 890, have a backstop 892 for securing the retainer element 860 in a housing. Step 880 becomes aligned with a bend 882 of the legs 866 which complements the securing of the retainer element 860 in the housing. A latch 884 is formed on the clasp 864 for securing the clasp 864 onto the body flange 878. The latch 884 is an elongated member having a contoured surface with a U-shaped aperture 886. A catch 888 extends into the U-shaped aperture 886 defining the interior border of the U.

The clasps 864 are mounted on the body 862 as follows. The latch 884 is positioned beyond the bend 877 of the flange 878 and retaining portion 876. With the retaining portion 876 nesting on the clasp 864, between the inclined walls 890, the clasp 864 is slid upon the retaining portion 876 of the legs 866. As this occurs, the catch 888 pushes up and travels over the flange 878, until the catch 888 reaches the end of the flange 878 which, at that time, the catch 888 resiliently springs downward trapping the flange 878 within the catch 888. Thus, the clasp 864 is secured to the body 862 forming a unitary retainer element 860.

While the above description constitutes the preferred embodiments of the present invention, it will be appreciated that the invention is susceptible to modification, variation and change without departing from the proper scope and fair meaning of the accompanying claims.

What is claimed is:

1. A retainer element for securing a conduit in a connector, the retainer element comprising:
   a body, said body having a collar means, said collar having an aperture therethrough for passage of said conduit, at least two deflectable legs projecting from said body, and clasp means secured to said legs for securing said conduit in said retainer element and in said connector, said clasp means includes a latch, said latch having a catch for securing said clasp on said leg of said body.

2. The retainer element according to claim 1, wherein said legs have a first portion projecting from said collar means, a retaining portion and a flange, said catch secures to said flange for securing said clasp means to said legs.

3. The retainer element according to claim 2 wherein said clasp means has at least one step, said step having a backstop for securing said retainer element in said connector.

4. A one piece metal retainer element for securing a conduit in a connector assembly, comprising:
   a collar having an aperture for permitting passage of said conduit through said collar; and
   at least two spaced legs projecting from one side of said collar, each of said legs being formed to provide a deflectable leg portion which extends from said collar and ends in a first bend to provide a backstop for securing said retainer element in said connector assembly, and a retaining leg portion which extends from said deflectable leg portion at said first bend and inclines generally toward the aperture in said collar, the end of said retaining leg portion being formed to engage said conduit such that said retaining leg portion will resist the disconnection of said conduit from said connector assembly when said conduit is disposed in its operative position within said connector assembly, said retaining leg portion including flange means for increasing the resistive force of said retaining leg portion.

5. The retainer element according to claim 4, wherein said flange means comprises a flange portion which doubles back upon said retaining leg portion.

6. The retainer element according to claim 4, wherein said flange means comprises an inclined flange which extends generally along at least one side of said retaining leg portion.

7. The retainer element according to claim 6, wherein said flange means includes a pair of inclined flanges disposed along opposite sides of said retaining leg portion, and each of said flanges includes finger means for grasping said retainer element and enabling said retainer element to be removed from said connector assembly.

8. The retainer element according to claim 4, wherein said flange means comprises a first flange portion which doubles back upon said retaining leg portion, and a pair of inclined flanges which extend generally along opposite sides of said retaining leg portion.

9. The retainer element according to claim 4, wherein said flange means includes a pair of inclined flanges disposed along opposite sides of said retaining leg portion, and each of said inclined flanges is formed with a step for securing said retainer element in said connector assembly.

10. The retainer element according to claim 4, wherein said retaining leg portion extends from said first bend to form an arm which bends back upon itself to enable said retainer element to be removed from said connector housing.

11. The retainer element according to claim 10, wherein said retaining leg portion includes a second bend at the end formed to engage said conduit, said second bend generally having a "V" shape.

12. A connector assembly for providing a quick connection, comprising:
   a tubular conduit adapted to convey fluid having outwardly projecting annular surface means, formed at a predetermined distance from an end of said conduit to be connected, for providing a blocking wall portion disposed transversely to a central axis of said conduit;
   a housing having axial bore means formed therein for receiving said conduit at a first end and for providing a fluid path for a second end, elastomeric ring means disposed in said bore means for providing a seal between said conduit and said housing; and
   a one piece metal retainer element for securing said conduit in said connector assembly, said retainer element being comprised of
   a collar having an aperture for permitting passage of said conduit through said collar, and
   at least two spaced legs projecting from one side of said collar, each of said legs being formed to provide a deflectable leg portion which extends from said collar and ends in a first bend to provide a backstop for securing said retainer element in said connector assembly, and a retaining leg portion which extends from said deflectable leg portion at said first bend and inclines generally toward the aperture in said collar, the end of said retaining leg portion being formed to engage said conduit such that said retainer leg portion will resist the disconnection of said conduit from said connector assembly when said conduit is disposed in its operative position within said connector assembly, said retaining leg portion including flange means for increasing the resistive force of said retaining leg portion.

* * * * *

UNITED STATES PATENT AND TRADEMARK OFFICE
CERTIFICATE OF CORRECTION

PATENT NO. : 4,681,351
DATED : July 21, 1987
INVENTOR(S) : Donald D. Bartholomew It is certified that error appears in the above-identified patent and that said Letters Patent is hereby corrected as shown below:

Abstract, line 15, "bousing" should be —housing—

Column 4, line 2, after "second" insert —retaining—

Column 4, line 16, after "aperture" insert —816—

Column 6, line 43, Claim 12, "for" should be —at—

Column 6, line 61, Claim 12, "retainer" should be —retaining—

Signed and Sealed this

First Day of December, 1987

Attest:

DONALD J. QUIGG

*Attesting Officer*    *Commissioner of Patents and Trademarks*